Sept. 2, 1958          R. L. KONLE          2,850,003
STARTING MECHANISM FOR POWER LAWNMOWERS
Filed Aug. 28, 1957          3 Sheets-Sheet 1
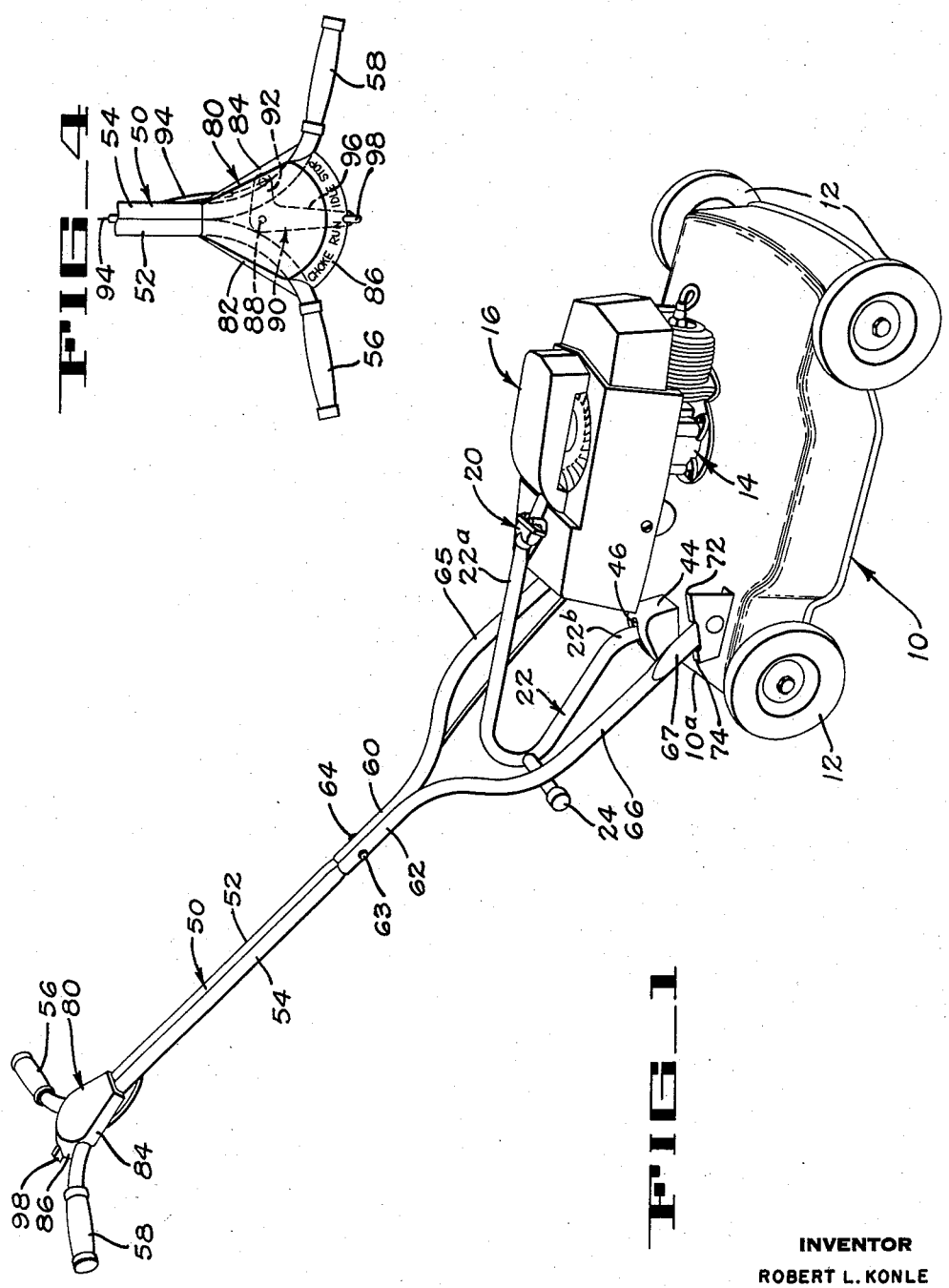
INVENTOR
ROBERT L. KONLE
BY *Hans G. Hoffmeister*
ATTORNEY Sept. 2, 1958      R. L. KONLE      2,850,003
STARTING MECHANISM FOR POWER LAWNMOWERS
Filed Aug. 28, 1957      3 Sheets-Sheet 2
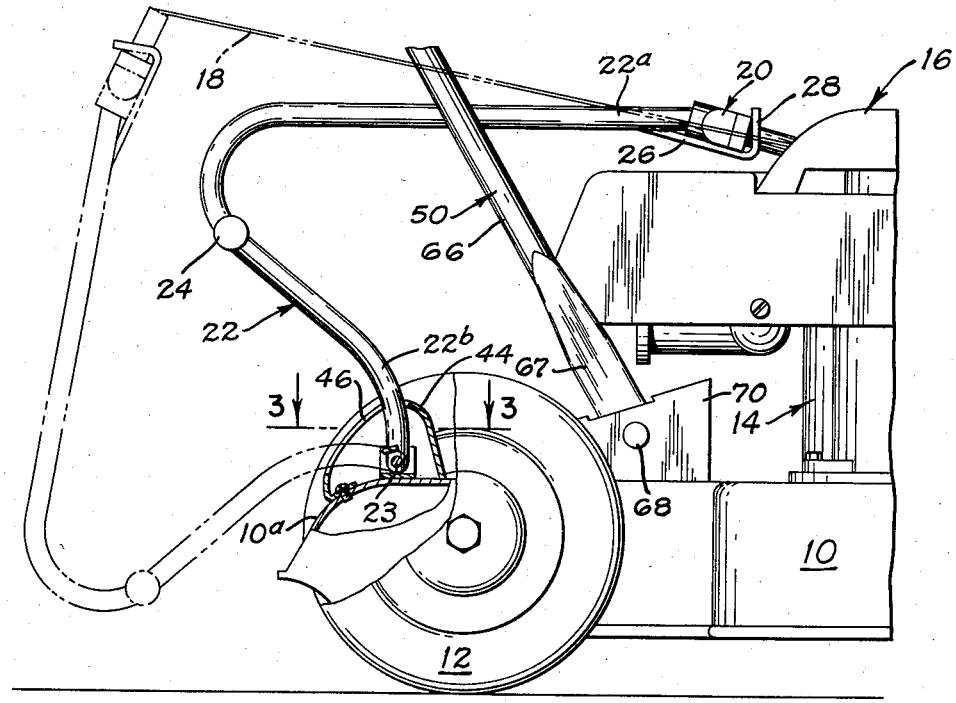
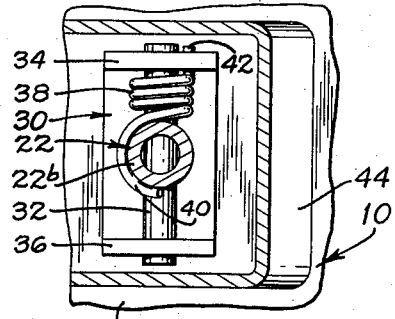
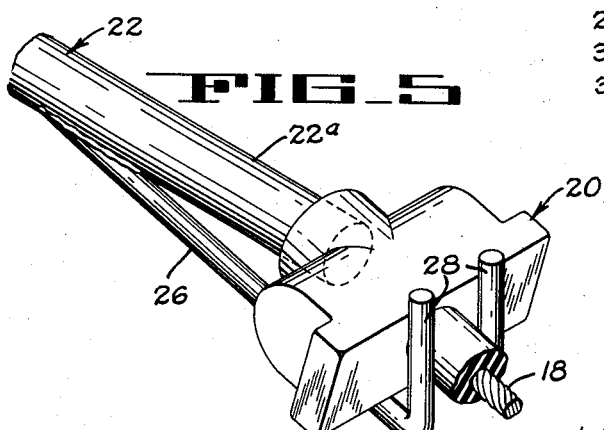
INVENTOR
ROBERT L. KONLE
BY
ATTORNEY Sept. 2, 1958 R. L. KONLE 2,850,003
STARTING MECHANISM FOR POWER LAWNMOWERS
Filed Aug. 28, 1957 3 Sheets-Sheet 3
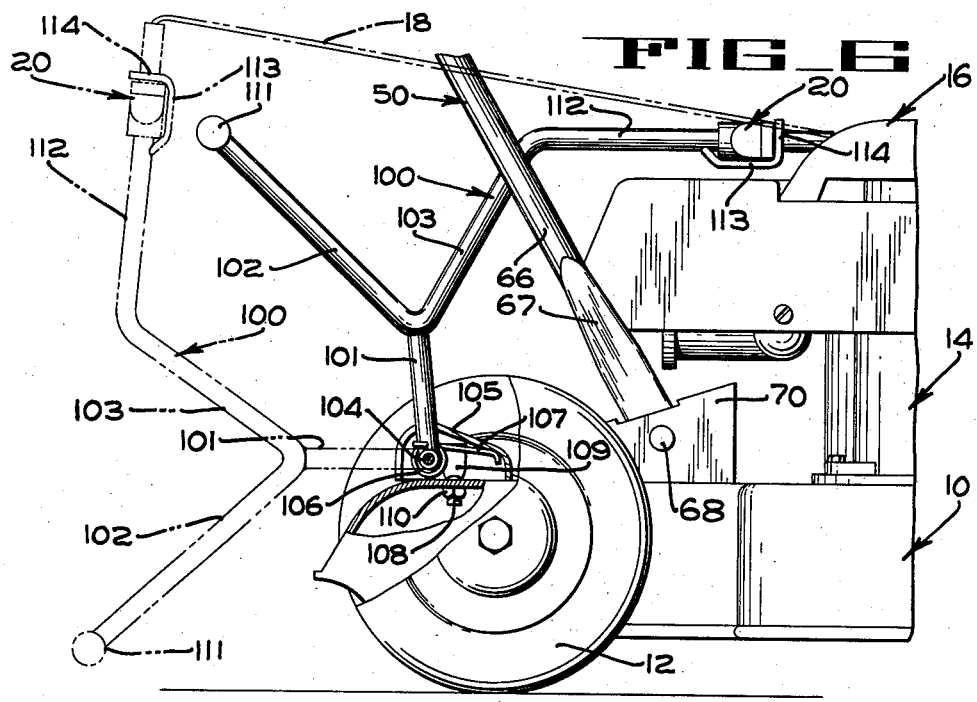
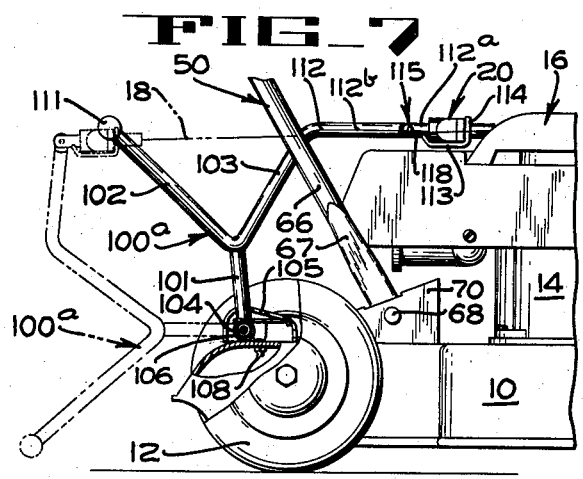
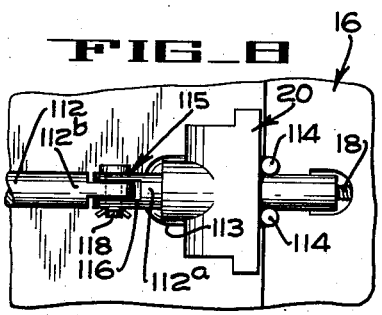
INVENTOR
ROBERT L. KONLE
BY
ATTORNEY United States Patent Office 2,850,003
Patented Sept. 2, 1958

2,850,003

STARTING MECHANISM FOR POWER LAWNMOWERS

Robert L. Konle, Waukesha County, Wis., assignor to Food Machinery and Chemical Corporation, San Jose, Calif., a corporation of Delaware Application August 28, 1957, Serial No. 680,762

4 Claims. (Cl. 123—185)

This invention pertains to power lawnmowers and more particularly relates to a starting and control mechanism therefor.

The present application is a continuation-in-part of my copending application Serial No. 596,011, filed July 5, 1956, entitled "Starting and Control Mechanism for Power Lawnmowers," now abandoned.

One object of the invention is to provide an efficient foot operated starter mechanism for a power lawnmower.

Another object is to provide an efficient starting and control mechanism for a power lawnmower which permits both starting and operating the mower without any stooping on the part of the operator.

These and other objects and advantages of the present invention will become apparent from the following description and accompanying drawings in which:

Fig. 1 is a perspective view of a power lawnmower embodying the invention.

Fig. 2 is a fragmentary side elevation of the mower shown in Fig. 1.

Fig. 3 is a sectional view taken on lines 3—3 of Fig. 2.

Fig. 4 is a plan view of the control assembly.

Fig. 5 is a perspective view of the detachable connection between the crank lever and the starter pull rope.

Fig. 6 is a fragmentary side elevation of the mower shown in Fig. 1 and illustrates a modified form of starting crank lever.

Fig. 7 is a similar view to that shown in Fig. 6 and illustrates a further modified form of starting crank lever.

Fig. 8 is a fragmentary plan view of a portion of Fig. 7.

Referring now to Fig. 1 of the drawings, the power lawnmower comprises a frame or housing 10 having rotatably mounted thereon a plurality of ground engaging wheels 12. The housing 10 encloses a rotating mower blade (not shown). An internal combustion engine, generally indicated 14, is fixed to the upper surface of the housing 10. A rope type cranking assembly 16 is fixed to the upper portion of the engine 14 and includes the usual pulley (not shown) provided with a pull rope or cable 18 (Figs. 2 and 5) terminating in a generally T-shaped handle 20. The handle 20 is detachably secured to one end 22a of a curved crank or kick start lever 22, the other end 22b of which is pivotally secured at 23 (Fig. 2) to the housing 10 adjacent the rear portion 10a thereof. A treadle bar or pedal 24 is connected to the crank lever 22 intermediate its ends and extends laterally therefrom. The detachable connection of the handle 20 provides an easy disconnection between the pull rope or cable 18 and the crank lever 22 in order to facilitate replacement of a worn or broken rope or cable, or to permit manual operation of the cranking assembly 16.

The detachable connection between the upper end of the crank lever 22 and the handle 20 of the pull rope 18 (Fig. 2) comprises a pair of forwardly extending fingers 26 (Fig. 5) fixed to the underside of the upper portion of the crank lever 22 and extending forwardly therefrom. The forward ends of the fingers 26 are bent upwardly in the manner shown at 28 (Figs. 1 and 5) to form a claw-like structure which embraces the T-shaped handle 20.

The pivotal mounting 23 for the lower end 22b of the crank lever 22 (Figs. 2 and 3) comprises a U-shaped bracket 30 fixed to the upper surface of the rear portion 10a of the housing 10 by spot welding or any other suitable means. A pivot pin 32 extends between ears 34 and 36 of the bracket 30 and through a suitable lateral bore in the lower end of the crank lever 22. A torsion spring 38 surrounds the pivot pin 32. One end 40 of the torsion spring 38 is hooked around the crank lever 22 and the other end 42 is hooked around the ear 34 on the bracket 30 so that the spring urges the crank lever 22 clockwise as viewed in Fig. 2 to its normal position illustrated in full lines therein. A housing 44 attached to the base 10 and having a slot 46 formed in its upper surface, surrounds the pivotal connection between the crank lever 22 and the housing 10.

It should be noted that the crank lever 22 is curved, i. e., so configurated (Figs. 1 and 2) that the treadle bar 24 is located rearwardly of the pivotal connection 23 between the crank lever and the housing 10, whereby downward pressure applied by the operator to the treadle 24 will cause the crank lever 22 to rotate counterclockwise about its pivotal connection from the position shown in full lines to that shown in dot-dash lines in Fig. 2, thus pulling out the pull rope 18 of the cranking mechanism 16 to crank the engine 14.

The power lawnmower is provided with the usual operator's handle generally indicated 50 (Fig. 1) for guiding the mower over the lawn. The handle 50 comprises an upper portion formed of two cylindrical members 52 and 54 fastened together in side-by-side relation as by welding. The upper ends of the members 52 and 54 are each bent outwardly to form two hand grip portions 56 and 58. The lower ends of the members 52 and 54 are of reduced diameters and are received within the upper ends of two similar lower cylindrical members 60 and 62 and are held therein by a bolt 63 extending through suitable matching apertures provided in the members 52, 54, 60 and 62, respectively, and fastened with a nut 64. The lower ends of the lower members 60 and 62 are bent outwardly and downwardly to form a yoke structure, the legs of which are indicated 65 and 66, respectively (Fig. 1).

The lower end of the leg 66 is flattened as indicated at 67 and is provided with a suitable aperture (not shown) which receives an inwardly extending pivot pin 68 fixed to a vertical bracket 70 welded or otherwise fastened to the upper surface of the mower housing 10 adjacent one side thereof. The upper edge of the bracket 70 is provided with two inwardly turned flanges 72 and 74, one forwardly of and one rearwardly of the leg 66 to limit the pivotal movement of the handle 50 relative to the mower housing 10. The leg 65 is similarly pivotally connected to the mower housing 10 adjacent the opposite side thereof.

The control mechanism is best illustrated in Fig. 4 and comprises a sector shaped plate 80 fixed to the handle 50 in any suitable manner between the hand grips 56 and 58. The sides of the plate 80 are turned downwardly to form two flanges 82 and 84. The rear of the plate 80 is arcuate in form and is turned downwardly to form an arcuate flange 86. A downwardly extending stud 88 is fixed to the underside of the plate 80 and a bell crank lever 90 is rotatably mounted on the stud 88. One arm 92 of the bell crank 90 is connected to the upper end of a Bowden wire 94, the lower end of which is connected to the controls of the engine 14 (Fig. 1). The other arm 96 of the bell crank 90 is provided with a handle 98 adjacent the flange 86 and is adapted to be moved by the operator to different positions relative thereto. The flange 86 is marked with indicia representing the positions of the engine controls corresponding to the respective positions of the handle 98 relative to the flange 86.

The operation of the lawnmower, the operator assumes the normal position behind the handle 50 and moves the motor control handle 98 to the "choke" position indicated on the flange 86. He then steps on the treadle 24 to initially crank the engine 14 for priming thereof. After the engine 14 has been primed, the operator moves the motor control to the "run" position and again steps on the treadle 24 to start the engine. If the operator desires to stop mowing temporarily he moves the motor control handle 98 to the "idle" position whereby the speed of the engine is reduced. When he desires to resume mowing the handle 98 is again moved to the "run" position. After the mowing is completed the handle 98 is moved to the "stop" position whereby stopping of the engine 14 is effected.

Fig. 6 illustrates a modified form of a crank lever 100. In this view the mower elements are the same as those described in Figs. 1 to 5, inclusive, and are therefore designated by the same reference numerals.

The crank lever 100 is generally Y-shaped and comprises a leg portion 101 and two arms 102 and 103. The lower end of the leg portion 101 is pivotally mounted on a pivot shaft 104 extending transversely between the side walls of an inverted U-shaped housing 105. A torsion spring 106 is hooked to the leg portion 101 of the crank lever 100 and is wound around the shaft 104. The end 107 of the spring 106 bears against the undersurface of the upper portion of the housing 105. Two mounting bolts 108, having their upper ends 109 flattened and welded to the inner surface of the side walls of the housing 105 extend downwardly through suitable apertures in the mower housing 10 and are secured thereto by nuts 110.

The arm 102 extends upwardly and rearwardly from the upper end of the leg 101 and is provided at its upper end with a laterally extending treadle bar 111. The arm 103 extends upwardly and forwardly from the upper end of the leg 101 and is provided at its upper end with a forwardly extending substantially horizontal extension 112. A pair of forwardly extending fingers 113 (only one of which is illustrated in Fig. 6) are fixed to the underside of the extension 112 and extend forwardly therefrom. The forward ends of the fingers 113 are bent upwardly in the manner illustrated at 114 to form a claw-like structure (such as shown in Fig. 5) which releasably embraces the T-shaped handle 20 of the pull rope 18 in the manner previously described.

The modification disclosed in Figs. 7 and 8 is substantially the same as that shown in Fig. 6 with the exception that the extension 112 forwardly from the arm 103 of the lever 100a comprises two portions 112a and 112b pivotally connected together by a hinge structure generally indicated 115. The hinge 115 (Fig. 8) comprises a yoke 116 within which the section 112b is pivotally secured by means of a pivot pin 118.

It should be evident that by providing the hinge 115 in the crank lever assembly 100a illustrated in Figs. 7 and 8, a straight line pull between the handle 20 and the pull rope 18 is always maintained, whereby the tendency of the rope to break due to excessive flexing at the point where the rope and handle join is materially reduced. It should also be obvious that, while it is not specifically illustrated herein, the hinged construction 115 could also be incorporated in the starting lever 22 illustrated in Figs. 1 to 5, inclusive.

The operation of the modification shown in Fig. 6, as well as that shown in Figs. 7 and 8, is substantially the same as that described in connection with Figs. 1 to 5, inclusive.

From the foregoing description it may be seen that the starting and control mechanism of the present invention enables the operator to completely control, start and stop the lawnmower without leaving his normal position behind the handle 50 of the mower.

While the invention has been disclosed herein in connection with a rotary type lawnmower, it is obvious that the principles thereof are equally applicable to lawnmowers of the reel type, and that various other changes may be made in the construction disclosed herein without departing from the spirit of the invention as defined in the appended claims.

Having thus described my invention, what I claim and desire to secure by Letters Patent is:

1. An engine starting mechanism for a power lawn mower having a base frame with a vertical crank shaft engine thereon and a cranking mechanism including a pulley having a pull rope wound thereon to start the engine in response to said rope being pulled laterally from the pulley, said starting mechanism comprising means on said base frame providing a fulcrum alongside the engine at an elevation lower than said pulley, a lever pivoted on said fulcrum and projecting upwardly and laterally therefrom, a pedal rigid with the lever in a position above the level of said base frame and spaced outwardly from said pulley beyond the vertical plane that includes the axis of said fulcrum, and means connecting the pull rope to the lever, whereby downward motion of said pedal rotates said lever about the axis of said fulcrum and draws the pull rope laterally from the pulley to actuate said cranking mechanism.

2. An engine starting mechanism for a power lawn mower having a base frame with a vertical crank shaft engine upstanding thereon and a cranking mechanism including a pulley adjacent the upper end of the engine and rotatable about a vertical axis, said pulley having a pull rope wound thereon to start the engine in response to said rope being pulled laterally from the pulley, said starting mechanism comprising means on said base frame providing a fulcrum alongside the engine at an elevation lower than said pulley, a lever pivoted on said fulcrum and projecting upwardly and laterally therefrom, a pedal rigid with the lever in a position above the level of said base frame and spaced laterally outward from said pulley beyond the vertical plane that includes the axis of said fulcrum, and means normally disposed adjacent said pulley connecting the pull rope to the lever, whereby downward motion of said pedal rotates said lever about the axis of said fulcrum and draws the pull rope laterally from the pulley to rotate said pulley and start the engine.

3. The mechanism of claim 1 wherein said fulcrum is at one end of said lever, and said lever is arcuately curved to extend upwardly from said fulcrum in a first direction inclined away from said engine and thence in a second direction toward said engine, said pedal extending from said lever along the portion thereof extending in said first direction and said pull rope being secured to the end of the lever portion extending in said second direction.

4. The mechanism of claim 1 wherein said lever is of substantially Y-shaped configuration and having said foot pedal rigid with one arm of the Y-lever, said rope being secured to the other arm of the Y-lever, and said fulcrum axis is located at the leg of the Y.

References Cited in the file of this patent

UNITED STATES PATENTS

| | | |
|---|---|---|
| 1,139,078 | Schwarze | May 11, 1915 |
| 1,321,057 | Knopp | Nov. 4, 1919 |
| 2,293,322 | Veach | Aug. 18, 1942 |
| 2,497,283 | Wharem et al. | Feb. 14, 1950 |
| 2,746,445 | Cocklin | May 22, 1956 |